(12) United States Patent
Kanamaru et al.

(10) Patent No.: US 8,975,202 B2
(45) Date of Patent: Mar. 10, 2015

(54) POLYMERIZATION CATALYSTS AND METHOD FOR PRESERVATION OF SAME

(75) Inventors: Masami Kanamaru, Chiba (JP); Takenori Fujimura, Chiba (JP); Minoru Yabukami, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 333 days.

(21) Appl. No.: 13/382,722

(22) PCT Filed: Jun. 10, 2010

(86) PCT No.: PCT/JP2010/059849
§ 371 (c)(1),
(2), (4) Date: Jan. 31, 2012

(87) PCT Pub. No.: WO2011/004676
PCT Pub. Date: Jan. 13, 2011

(65) Prior Publication Data
US 2012/0129683 A1    May 24, 2012

(30) Foreign Application Priority Data

Jul. 8, 2009    (JP) .................. 2009-161752

(51) Int. Cl.
| | | |
|---|---|---|
| *C08F 4/6592* | (2006.01) | |
| *C08F 4/642* | (2006.01) | |
| *C08F 4/643* | (2006.01) | |
| *C08F 4/649* | (2006.01) | |
| *C08F 10/00* | (2006.01) | |
| *C08F 4/659* | (2006.01) | |
| *C08F 110/06* | (2006.01) | |
| *C08F 110/14* | (2006.01) | |

(52) U.S. Cl.
CPC ............. *C08F 10/00* (2013.01); *C08F 4/65908* (2013.01); *C08F 4/65912* (2013.01); *C08F 4/65927* (2013.01); *C08F 110/06* (2013.01); *C08F 110/14* (2013.01); *Y10S 526/943* (2013.01)
USPC ........... 502/108; 502/103; 502/128; 502/152; 526/75; 526/133; 526/160; 526/348; 526/943

(58) Field of Classification Search
CPC ........... C08F 4/60; C08F 4/602; C08F 4/603; C08F 4/609; C08F 6/642; C08F 4/643; C08F 4/64; C08F 4/6592; C08F 4/649; C08F 4/65908; C08F 4/65912; C08F 5450/00
USPC ............ 502/108, 103, 128, 152; 526/75, 133, 526/160, 348, 943
See application file for complete search history.

(56) References Cited

U.S. PATENT DOCUMENTS

| | | |
|---|---|---|
| 2004/0054102 A1 | 3/2004 | Ishigaki et al. |
| 2005/0159566 A1 | 7/2005 | Minami et al. |
| 2009/0124771 A1 | 5/2009 | Kanamaru |
| 2010/0036066 A1 | 2/2010 | Fujimura et al. |

FOREIGN PATENT DOCUMENTS

| | | |
|---|---|---|
| EP | 0 773 239 A2 | 5/1997 |
| EP | 0 773 239 A3 | 5/1997 |
| EP | 1 359 166 A1 | 11/2003 |
| JP | 2007 186718 | 7/2007 |
| WO | 2006 117983 | 11/2006 |
| WO | 2008 102729 | 8/2008 |
| WO | 2009 066689 | 5/2009 |

OTHER PUBLICATIONS

U.S. Appl. No. 13/699,679, filed Dec. 11, 2012, Yabukami, et al.
International Search Report issued on Sep. 7, 2010 in PCT/JP10/059849 filed on Jun. 10, 2010.
Extended European Search Report issued Feb. 17, 2014 in Patent Application No. 10796987.5.

*Primary Examiner* — Caixia Lu
(74) *Attorney, Agent, or Firm* — Oblon, McClelland, Maier & Neustadt, L.L.P.

(57) ABSTRACT

The invention provides a polymerization catalyst produced by bringing components (A) to (D) into contact with one another in a hydrocarbon solvent at 30 to 60° C., wherein the component (A) is a transition metal compound, the component (B) is a solid boron compound capable of forming an ion pair with component (A), the component (C) is an organoaluminum compound, and the component (D) is one or more unsaturated hydrocarbon compounds selected from among an α-olefin, an internal olefin, and a polyene; and the amounts of component (B) and component (C) are 1.2 to 4.0 mol and 5.0 to 50.0 mol, respectively, on the basis of 1 mol of component (A), which catalyst exhibits high activity and can be readily supplied to a polymerization reaction system. The invention also provides a method of storing the polymerization catalyst at 0 to 35° C.

26 Claims, No Drawings

POLYMERIZATION CATALYSTS AND METHOD FOR PRESERVATION OF SAME

This application is a National Stage of PCT/JP10/059849 filed Jun. 10, 2010 and claims the benefit of JP 2009-11752 filed Jul. 8, 2009.

TECHNICAL FIELD

The present invention relates to a polymerization catalyst produced by bringing components (A) to (D) into contact with one another, wherein the component (A) is a transition metal compound, the component (B) is a solid boron compound capable of forming an ion pair with component (A), the component (C) is an organoaluminum compound, and the component (D) is one or more unsaturated hydrocarbon compounds selected from among an α-olefin, an internal olefin, and a polyene; and to a method of storing the catalyst.

BACKGROUND ART

Generally, polymerization of an α-olefin in the presence of a metallocene catalyst employs methylaluminoxane or a boron compound as a promoter.

When a boron compound which is difficult to dissolve in a hydrocarbon solvent is employed as a promoter, in order to continuously supply the promoter in a homogeneous state to a reactor for polymerization of an α-olefin, a homogeneous catalyst is prepared before polymerization by bringing the boron compound into contact with a transition metal compound in a hydrocarbon solvent in the presence or absence of an organoaluminum compound (see, for example, Patent Document 1 or 2).

Such a technique facilitates supply of a catalyst to a polymerization reaction system. However, a catalyst used in such a reaction system is required to exhibit further improved polymerization activity.

Meanwhile, there has been proposed a method for preparing a catalyst exhibiting improved activity, by bringing a transition metal compound, a boron compound, and an α-olefin into contact with one another in a hydrocarbon solvent (see Patent Document 3).

However, the catalyst prepared through this technique is also required to exhibit further improved polymerization activity.

PRIOR ART DOCUMENT

Patent Document

Patent Document 1: Japanese Patent No. 2918193
Patent Document 2: Japanese Patent No. 2939321
Patent Document 3: International Publication WO 2006/117983

SUMMARY OF THE INVENTION

Problems to be Solved by the Invention

In view of the foregoing, an object of the present invention is to provide a homogeneous polymerization catalyst which exhibits high activity and can be readily supplied to a polymerization reaction system. Another object of the present invention is to provide a method of storing the catalyst while suppressing reduction in the activity of the catalyst.

Means for Solving the Problems

The present inventors have found that when a catalyst is produced by bringing components (A) to (D) into contact with one another in specific proportions by mole in a hydrocarbon solvent under specific temperature conditions, wherein the component (A) is a transition metal compound, the component (B) is a solid boron compound capable of forming an ion pair with component (A), the component (C) is an organoaluminum compound, and the component (D) is one or more unsaturated hydrocarbon compounds selected from among an α-olefin, an internal olefin, and a polyene, the resultant catalyst exhibits high activity. Also, the present inventors have found that storage of the catalyst requires specific temperature conditions.

The present invention has been accomplished on the basis of these findings.

Accordingly, the present invention provides:

1. a polymerization catalyst produced by bringing components (A) to (D) into contact with one another in a hydrocarbon solvent at 30 to 60° C., wherein the component (A) is a transition metal compound, the component (B) is a solid boron compound capable of forming an ion pair with the component (A), the component (C) is an organoaluminum compound, and the component (D) is one or more unsaturated hydrocarbon compounds selected from among an α-olefin, an internal olefin, and a polyene; and the amounts of the component (B) and the component (C) are 1.2 to 4.0 mol and 5.0 to 50.0 mol, respectively, on the basis of 1 mol of the component (A);

2. a polymerization catalyst according to claim 1, wherein the component (D) is a C3 to C30 α-olefin, and the amount of the component (D) is 1.0 to 200 parts by mass on the basis of 1 part by mass of the component (A); and 3. a method of storing a polymerization catalyst as recited in claim 1 or 2, characterized by storing the catalyst at 0 to 35° C.

Effects of the Invention

The polymerization catalyst of the present invention is a transition metal compound-organoboron compound catalyst which exhibits high activity and can be readily supplied to a polymerization reaction system.

According to the catalyst storing method of the present invention, reduction in activity of the aforementioned polymerization catalyst can be suppressed.

BEST MODES FOR CARRYING OUT THE INVENTION

The polymerization catalyst of the present invention is produced by bringing components (A) to (D) into contact with one another in a hydrocarbon solvent at 30 to 60° C., wherein the component (A) is a transition metal compound, the component (B) is a solid boron compound capable of forming an ion pair with the component (A), the component (C) is an organoaluminum compound, and the component (D) is one or more unsaturated hydrocarbon compounds selected from among an α-olefin, an internal olefin, and a polyene; and the amounts of the component (B) and the component (C) are 1.2 to 4.0 mol and 5.0 to 50.0 mol, respectively, on the basis of 1 mol of the component (A).

The below-described compounds are preferably employed as the respective components of the polymerization catalyst of the present invention.

Examples of the transition metal compound (component (A)) employed in the present invention include a chelate complex, and a metallocene complex having a non-cross-linked or cross-linked ligand.

Examples of the chelate complex include N,N'-bis(2,6-diisopropylphenyl)-1,2-dimethylethylenediiminonickel dibromide and N,N'-bis(2,6-diisopropylphenyl)-1,2-dimethylethylenediiminopalladium dibromide.

Examples of the metallocene complex having a non-cross-linked ligand include biscyclopentadienylzirconium dichloride, bis(n-butylcyclopentadienyl)zirconium dichloride, bis(pentamethylcyclopentadienyl)zirconium dichloride, bisindenylzirconium dichloride, and bis(tetramethylcyclopentadienyl)zirconium dichloride.

In the present invention, a metallocene complex in which the ligands form a cross-linked structure via a cross-linking group exhibits polymerization activity higher than that of a metallocene complex in which the ligands do not form a cross-linked structure.

Therefore, among metallocene complexes, a metallocene complex in which the ligands form a cross-linked structure via a cross-linking group is preferred, a single-cross-linked metallocene complex and a double-cross-linked metallocene complex are more preferred, and a double-cross-linked metallocene complex is most preferred.

Examples of the single-cross-linked metallocene complex include dimethylsilylene(tetramethylcyclopentadienyl)(3-tert-butyl-5-methyl-2-phenoxy)zirconium dichloride, dimethylsilylene(tetramethylcyclopentadienyl) (tert-butylamido)zirconium dichloride, dimethylsilylenebis(2-methyl-4,5-benzoindenyl)zirconium dichloride, dimethylsilylenebis(2-methyl-4-phenylindenyl)zirconium dichloride, dimethylsilylenebis(2-methyl-4-naphthylindenyl)zirconium dichloride, dimethylsilylenebis(2-methylindenyl)zirconium dichloride, and ethylenebis(2-methylindenyl)zirconium dichloride, and ethylenebisindenylzirconium dichloride.

Examples of the double-cross-linked metallocene complex include double-cross-linked metallocene complexes represented by the following formula (I):

[F1]

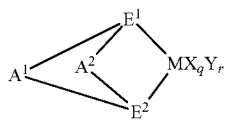

(I)

[wherein M represents a metal element belonging to Groups 3 to 10 of the periodic table or the lanthanoid series; each of $E^1$ and $E^2$ represents a ligand selected from among a substituted cyclopentadienyl group, an indenyl group, a substituted indenyl group, a heterocyclopentadienyl group, a substituted heterocyclopentadienyl group, an amido group, a phosphido group, a hydrocarbon group, and a silicon-containing group, $E^1$ and $E^2$ form a cross-linked structure via $A^1$ and $A^2$, and $E^1$ and $E^2$ may be identical to or different from each other; X represents a σ-bonding ligand, and, when a plurality of ligands X are present, the ligands X may be identical to or different from one another, and one ligand X may be cross-linked with another ligand X, $E^1$, $E^2$, or Y; Y represents a Lewis base, and, when a plurality of Lewis bases Y are present, the bases Y may be identical to or different from one another, and one base Y may be cross-linked with another base Y, $E^1$, $E^2$, or X; each of $A^1$ and $A^2$ represents a divalent cross-linking group for bonding two ligands and represents a C1 to C20 hydrocarbon group, a C1 to C20 halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$— (wherein R$^1$ represents a hydrogen atom, a halogen atom, a C1 to C20 hydrocarbon group, or a C1 to C20 halogen-containing hydrocarbon group), and $A^1$ and $A^2$ may be identical to or different from each other; q is an integer from 1 to 5 [(valence of M)−2]; and r is an integer from 0 to 3].

In formula (I), M represents a metal element belonging to Groups 3 to 10 of the periodic table or the lanthanoid series. Specific examples of the metal element include titanium, zirconium, hafnium, yttrium, vanadium, chromium, manganese, nickel, cobalt, palladium, and lanthanoid series metals. Of these, titanium, zirconium, and hafnium are preferred, from the viewpoint of, for example, olefin polymerization activity.

Each of $E^1$ and $E^2$ represents a ligand selected from among a substituted cyclopentadienyl group, an indenyl group, a substituted indenyl group, a heterocyclopentadienyl group, a substituted heterocyclopentadienyl group, an amido group (—N<), a phosphine group (—P<), a hydrocarbon group [>CR—, >C<], and a silicon-containing group [>SiR—, >Si<] (wherein R represents a hydrogen atom, a C1 to C20 hydrocarbon group, or a heteroatom-containing group), and $E^1$ and $E^2$ form a cross-linked structure via $A^1$ and $A^2$.

$E^1$ and $E^2$ may be identical to or different from each other.

$E^1$ or $E^2$ is preferably a substituted cyclopentadienyl group, an indenyl group, or a substituted indenyl group, from the viewpoint of further improvement of polymerization activity.

X represents a σ-bonding ligand. When a plurality of ligands X are present, the ligands X may be identical to or different from one another, and one ligand X may be cross-linked with another ligand X, $E^1$, $E^2$, or Y.

Specific examples of the ligand X include a halogen atom, a C1 to C20 hydrocarbon group, a C1 to C20 alkoxy group, a C6 to C20 aryloxy group, a C1 to C20 amido group, a C1 to C20 silicon-containing group, a C1 to C20 phosphido group, a C1 to C20 sulfide group, and a C1 to C20 acyl group.

Y represents a Lewis base. When a plurality of Lewis bases Y are present, the bases Y may be identical to or different from one another, and one base Y may be cross-linked with another base Y, $E^1$, $E^2$, or X. Specific examples of the Lewis base Y include amines, ethers, phosphines, and thioethers.

Each of $A^1$ and $A^2$ represents a divalent cross-linking group for bonding two ligands and represents a C1 to C20 hydrocarbon group, a C1 to C20 halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$— (wherein R$^1$ represents a hydrogen atom, a halogen atom, a C1 to C20 hydrocarbon group, or a C1 to C20 halogen-containing hydrocarbon group). $A^1$ and $A^2$ may be identical to or different from each other.

Examples of such a cross-linking group include those represented by the following formula:

[F2]

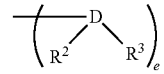

(wherein D represents carbon, silicon, or tin; each of $R^2$ and $R^3$ represents a hydrogen atom or a C1 to C20 hydrocarbon group, and $R^2$ and $R^3$ may be identical to or different from each other, and may bond together to form a ring structure; and e is an integer from 1 to 4).

Specific examples of the cross-linking group include a methylene group, an ethylene group, an ethylidene group, a propylidene group, an isopropylidene group, a cyclohexylidene group, a 1,2-cyclohexylene group, a vinylidene group ($CH_2=C=$), a dimethylsilylene group, a diphenylsilylene group, a methylphenylsilylene group, dimethylgermylene group, a dimethylstannylene group, a tetramethyldisilylene group, and a diphenyldisilylene group.

Of these, an ethylene group, an isopropylidene group, and a dimethylsilylene group are preferred, from the viewpoint of further improvement of polymerization activity.

In formula (I), q is an integer from 1 to 5 [(valence of M)–2], and r is an integer from 0 to 3.

Among double-cross-linked metallocene complexes represented by formula (I), a metallocene complex represented by the following formula (II):

[F3]

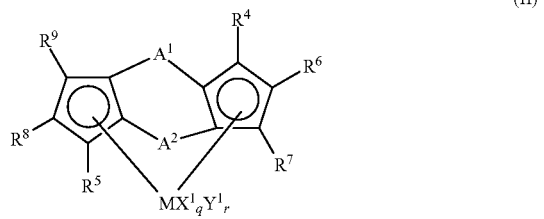

(II)

(i.e., a metallocene complex having, as a ligand, a double-cross-linked biscyclopentadienyl derivative) is preferred, from the viewpoint of further improvement of polymerization activity.

In formula (II), M, $A^1$, $A^2$, q, and r have the same meanings as defined above.

$X^1$ represents a σ-bonding ligand. When a plurality of ligands $X^1$ are present, the ligands $X^1$ may be identical to or different from one another, and one ligand $X^1$ may be cross-linked with another ligand $X^1$ or $Y^1$.

Specific examples of the ligand $X^1$ include the same as those exemplified above with regard to X of formula (I).

$Y^1$ represents a Lewis base. When a plurality of Lewis bases $Y^1$ are present, the bases $Y^1$ may be identical to or different from one another, and one base $Y^1$ may be cross-linked with another base $Y^1$ or $X^1$.

Specific examples of the base $Y^1$ include the same as those exemplified above with regard to Y of formula (I).

Each of $R^4$ to $R^9$ represents a hydrogen atom, a halogen atom, a C1 to C20 hydrocarbon group, a C1 to C20 halogen-containing hydrocarbon group, a silicon-containing group, or a heteroatom-containing group. It is required that at least one of $R^4$ to $R^9$ is not a hydrogen atom.

$R^4$ to $R^9$ may be identical to or different from one another. Adjacent groups of $R^4$ to $R^9$ may bond together to form a ring.

Among others, preferably, $R^6$ and $R^7$ form a ring, and $R^8$ and $R^9$ form a ring, from the viewpoint of further improvement of polymerization activity.

$R^4$ or $R^5$ is preferably a group containing a heteroatom such as oxygen, halogen, or silicon, from the viewpoint of improvement of polymerization activity.

The metallocene complex having, as a ligand, a double-cross-linked biscyclopentadienyl derivative preferably contains silicon in the cross-linking group of the ligand.

Specific examples of the double-cross-linked metallocene complex represented by formula (I) include (1,2'-ethylene) (2,1'-ethylene)-bis(indenyl)zirconium dichloride, (1,2'-methylene) (2,1'-methylene)-bis(indenyl)zirconium dichloride, (1,2'-isopropylidene) (2,1'-isopropylidene)-bis(indenyl)zirconium dichloride, (1,2'-ethylene) (2,1'-ethylene)-bis(3-methylindenyl)zirconium dichloride, (1,2'-ethylene) (2,1'-ethylene)-bis(4,5-benzoindenyl)zirconium dichloride, (1,2'-ethylene) (2,1'-ethylene)-bis(4-isopropylindenyl)zirconium dichloride, (1,2'-ethylene) (2,1'-ethylene)-bis(5,6-dimethylindenyl)zirconium dichloride, (1,2'-ethylene) (2,1'-ethylene)-bis(4,7-diisopropylindenyl)zirconium dichloride, (1,2'-ethylene) (2,1'-ethylene)-bis(4-phenylindenyl)zirconium dichloride, (1,2'-ethylene) (2,1'-ethylene)-bis(3-methyl-4-isopropylindenyl)zirconium dichloride, (1,2'-ethylene) (2,1'-ethylene)-bis(5,6-benzoindenyl)zirconium dichloride, (1,2'-ethylene) (2,1'-isopropylidene)-bis(indenyl)zirconium dichloride, (1,2'-methylene) (2,1'-ethylene)-bis(indenyl)zirconium dichloride, (1,2'-methylene) (2,1'-isopropylidene)-bis(indenyl)zirconium dichloride, (1,2'-dimethylsilylene) (2,1'-dimethylsilylene)bis(indenyl)zirconium dichloride, (1,2'-dimethylsilylene) (2,1'-dimethylsilylene)bis(3-methylindenyl)zirconium dichloride, (1,2'-dimethylsilylene) (2,1'-dimethylsilylene)bis(3-n-butylindenyl)zirconium dichloride, (1,2'-dimethylsilylene) (2,1'-dimethylsilylene)bis(3-isopropylindenyl)zirconium dichloride, (1,2'-dimethylsilylene) (2,1'-dimethylsilylene)bis(3-trimethylsilylmethylindenyl)zirconium dichloride, (1,2'-dimethylsilylene) (2,1'-dimethylsilylene)bis(3-phenylindenyl)zirconium dichloride, (1,2'-dimethylsilylene) (2,1'-dimethylsilylene)bis(4,5-benzoindenyl)zirconium dichloride, (1,2'-dimethylsilylene) (2,1'-dimethylsilylene)bis(4-isopropylindenyl)zirconium dichloride, (1,2'-dimethylsilylene) (2,1'-dimethylsilylene)bis(5,6-dimethylindenyl)zirconium dichloride, (1,2'-dimethylsilylene) (2,1'-dimethylsilylene)bis(4,7-di-isopropylindenyl)zirconium dichloride, (1,2'-dimethylsilylene) (2,1'-dimethylsilylene)bis(4-phenylindenyl)zirconium dichloride, (1,2'-dimethylsilylene) (2,1'-dimethylsilylene)bis(3-methyl-4-isopropylindenyl)zirconium dichloride, (1,2'-dimethylsilylene) (2,1'-dimethylsilylene)bis(5,6-benzoindenyl)zirconium dichloride, (1,2'-dimethylsilylene) (2,1'-isopropylidene)-bis(indenyl)zirconium dichloride, (1,2'-dimethylsilylene) (2,1'-isopropylidene)-bis(3-methylindenyl)zirconium dichloride, (1,2'-dimethylsilylene) (2,1'-isopropylidene)-bis(3-isopropylindenyl)zirconium dichloride, (1,2'-dimethylsilylene) (2,1'-isopropylidene)-bis(3-n-butylindenyl)zirconium dichloride, (1,2'-dimethylsilylene) (2,1'-isopropylidene)-bis(3-trimethylsilylmethylindenyl)zirconium dichloride, (1,2'-dimethylsilylene) (2,1'-isopropylidene)-bis(3-trimethylsilylindenyl)zirconium dichloride, (1,2'-dimethylsilylene) (2,1'-isopropylidene)-bis(3-phenylindenyl)zirconium dichloride, (1,2'-dimethylsilylene) (2,1'-methylene)-bis(indenyl)zirconium dichloride, (1,2'-dimethylsilylene) (2,1'-methylene)-bis(3-methylindenyl)zirconium dichloride, (1,2'-dimethylsilylene) (2,1'-methylene)-bis(3-isopropylindenyl)zirconium dichloride, (1,2'-dimethylsilylene) (2,1'-methylene)-bis(3-n-butylindenyl)zirconium dichloride, (1,2'-dimethylsilylene) (2,1'-methylene)-bis(3-trimethylsilylmethylindenyl)zirconium dichloride, (1,2'-dimethylsilylene) (2,1'-methylene)-bis(3-trimethylsilylindenyl)zirconium dichloride, (1,2'-diphenylsilylene) (2,1'-methylene)-bis(indenyl)zirconium dichloride, (1,2'-diphenylsilylene) (2,1'-methylene)-bis(3-methylindenyl)zirconium dichloride, (1,2'-diphenylsilylene) (2,1'-methylene)-bis(3-isopropylindenyl)zirconium dichloride, (1,2'-diphenylsilylene) (2,1'-methylene)-bis(3-n-butylindenyl)zirconium dichloride, (1,2'-diphenylsilylene) (2,1'-methylene)-bis(3-trimethylsilylmethylindenyl)zirconium dichloride, (1,2'-diphenylsilylene) (2,1'-methylene)-bis (3-trimethylsilylindenyl)zirconium dichloride, (1,2'-dimethylsilylene) (2,1'-dimethylsilylene) (3-methylcyclopentadienyl) (3'-methylcyclopentadienyl)zirconium dichloride, (1,2'-dimethylsilylene) (2,1'-isopropylidene) (3-methylcyclopentadienyl) (3'-methylcyclopentadienyl)zirconium dichloride, (1,2'-dimethylsilylene) (2,1'-ethylene) (3-methylcyclopentadienyl) (3'-methylcyclopentadienyl)zirconium dichloride, (1,2'-ethylene) (2,1'-methylene) (3-methylcyclopentadienyl) (3'-methylcyclopentadienyl)zirconium dichloride, (1,2'-ethylene) (2,1'-isopropylidene) (3-methylcyclopentadienyl) (3'-methylcyclopentadienyl)zirconium dichloride, (1,2'-methylene) (2,1'-methylene) (3-methylcyclopentadienyl) (3'-methylcyclopentadienyl)zirconium dichloride, (1,2'-methylene) (2,1'-isopropylidene) (3-methylcyclopentadienyl)(3'-methylcyclopentadienyl)zirconium dichloride, (1,2'-isopropylidene) (2,1'-isopropylidene) (3-methylcyclopentadienyl) (3'-methylcyclopentadienyl)zirconium dichloride, (1,2'-dimethylsilylene) (2,1'-dimethylsilylene) (3,4-dimethylcyclopentadienyl) (3',4'-dimethylcyclopentadienyl)zirconium dichloride, (1,2'-dimethylsilylene) (2,1'-isopropylidene) (3,4-dimethylcyclopentadienyl) (3',4'-dimethylcyclopentadienyl)zirconium dichloride, (1,2'-dimethylsilylene) (2,1'-ethylene) (3,4-dimethylcyclopentadienyl) (3',4'-dimethylcyclopentadienyl)zirconium dichloride, (1,2'-ethylene) (2,1'-methylene) (3,4-dimethylcyclopentadienyl) (3',4'-dimethylcyclopentadienyl)zirconium dichloride, (1,2'-ethylene) (2,1'-isopropylidene) (3,4-dimethylcyclopentadienyl) (3',4'-dimethylcyclopentadienyl)zirconium dichloride, (1,2'-methylene) (2,1'-methylene) (3,4-dimethylcyclopentadienyl) (3',4'-dimethylcyclopentadienyl) zirconium dichloride, (1,2'-methylene) (2,1'-isopropylidene) (3,4-dimethylcyclopentadienyl) (3',4'-dimethylcyclopentadienyl)zirconium dichloride, (1,2'-isopropylidene) (2,1'-isopropylidene) (3,4-dimethylcyclopentadienyl) (3',4'-dimethylcyclopentadienyl)zirconium dichloride, (1,2'-dimethylsilylene) (2,1'-dimethylsilylene) (3-methyl-5-ethylcyclopentadienyl) (3'-methyl-5'-ethylcyclopentadienyl) zirconium dichloride, (1,2'-dimethylsilylene) (2,1'-dimethylsilylene) (3-methyl-5-ethylcyclopentadienyl) (3'-methyl-5'-ethylcyclopentadienyl)zirconium dichloride, (1,2'-dimethylsilylene) (2,1'-dimethylsilylene) (3-methyl-5-isopropylcyclopentadienyl) (3-methyl-5'-isopropylcyclopentadienyl)zirconium dichloride, (1,2'-dimethylsilylene) (2,1'-dimethylsilylene) (3-methyl-5-n-butylcyclopentadienyl) (3'-methyl-5'-n-butylcyclopentadienyl)zirconium dichloride, (1,2'-dimethylsilylene) (2,1'-dimethylsilylene) (3-methyl-5-phenylcyclopentadienyl) (3'-methyl-5'-phenylcyclopentadienyl)zirconium dichloride, (1,2'-dimethylsilylene) (2,1'-isopropylidene) (3-methyl-5-ethylcyclopentadienyl) (3'-methyl-5'-ethylcyclopentadienyl) zirconium dichloride, (1,2'-dimethylsilylene) (2,1'-isopropylidene) (3-methyl-5-isopropylcyclopentadienyl) (3'-methyl-5'-isopropylcyclopentadienyl)zirconium dichloride, (1,2'-dimethylsilylene) (2,1'-isopropylidene) (3-methyl-5-n-butylcyclopentadienyl) (3'-methyl-5'-n-butylcyclopentadienyl)zirconium dichloride, (1,2'-dimethylsilylene) (2,1'-isopropylidene) (3-methyl-5-phenylcyclopentadienyl) (3'-methyl-5'-phenylcyclopentadienyl)zirconium dichloride, (1,2'-dimethylsilylene) (2,1'-ethylene) (3-methyl-5-ethylcyclopentadienyl) (3'-methyl-5'-ethylcyclopentadienyl)zirconium dichloride, (1,2'-dimethylsilylene) (2,1'-ethylene) (3-methyl-5-isopropylcyclopentadienyl) (3'-methyl-5'-isopropylcyclopentadienyl)zirconium dichloride, (1,2'-dimethylsilylene) (2,1'-ethylene) (3-methyl-5-n-butylcyclopentadienyl) (3'-methyl-5'-n-butylcyclopentadienyl)zirconium dichloride, (1,2'-dimethylsilylene) (2,1'-ethylene) (3-methyl-5-phenylcyclopentadienyl) (3'-methyl-5'-phenylcyclopentadienyl)zirconium dichloride, (1,2'-methylene) (3-methyl-5-ethylcyclopentadienyl) (3'-methyl-5'-ethylcyclopentadienyl)zirconium dichloride, (1,2'-dimethylsilylene) (2,1'-methylene) (3-methyl-5-isopropylcyclopentadienyl) (3'-methyl-5'-isopropylcyclopentadienyl)zirconium dichloride, (1,2'-dimethylsilylene) (2,1'-methylene) (3-methyl-5-n-butylcyclopentadienyl) (3'-methyl-5'-n-butylcyclopentadienyl)zirconium dichloride, (1,2'-dimethylsilylene) (2,1'-methylene) (3-methyl-5-phenylcyclopentadienyl) (3'-methyl-5'-phenylcyclopentadienyl)zirconium dichloride, (1,2'-ethylene) (2,1'-methylene) (3-methyl-5-isopropylcyclopentadienyl) (3'-methyl-5'-isopropylcyclopentadienyl)zirconium dichloride, (1,2'-ethylene) (2,1'-isopropylidene) (3-methyl-5-isopropylcyclopentadienyl) (3'-methyl-5'-isopropylcyclopentadienyl)zirconium dichloride, (1,2'-methylene) (2,1'-methylene) (3-methyl-5-isopropylcyclopentadienyl) (3'-methyl-5'-isopropylcyclopentadienyl) zirconium dichloride, (1,2'-methylene) (2,1'-isopropylidene) (3-methyl-5-isopropylcyclopentadienyl) (3'-methyl-5'-isopropylcyclopentadienyl)zirconium dichloride, (1,1'-dimethylsilylene) (2,2'-dimethylsilylene)bisindenylzirconium dichloride, (1,1'-diphenylsilylene) (2,2'-dimethylsilylene) bisindenylzirconium dichloride, (1,1'-dimethylsilylene) (2,2'-dimethylsilylene)bisindenylzirconium dichloride, (1,1'-diisopropylsilylene) (2,2'-dimethylsilylene)bisindenylzirconium dichloride, (1,1'-dimethylsilylene) (2,2'-diisopropylsilylene)bisindenylzirconium dichloride, (1,1'-dimethylsilyleneindenyl) (2,2'-dimethylsilylene-3-trimethylsilylindenyl)zirconium dichloride, (1,1'-diphenylsilyleneindenyl) (2,2'-diphenylsilylene-3-trimethylsilylindenyl)zirconium dichloride, (1,1'-diphenylsilyleneindenyl) (2,2'-dimethylsilylene-3-trimethylsilylindenyl)zirconium dichloride, (1,1'-dimethylsilyleneindenyl) (2,2'-diphenylsilylene-3-trimethylsilylindenyl)zirconium dichloride, (1,1'-diisopropylsilyleneindenyl) (2,2'-dimethylsilylene-3-trimethylsilylindenyl)zirconium dichloride, (1,1'-dimethylsilyleneindenyl) (2,2'-diisopropylsilylene-3-trimethylsilylindenyl)zirconium dichloride, (1,1'-diisopropylsilyleneindenyl) (2,2'-diisopropylsilylene-3-trimethylsilylindenyl)zirconium dichloride, (1,1'-dimethylsilyleneindenyl) (2,2'-dimethylsilylene-3-trimethylsilylmethylindenyl)zirconium dichloride, (1,1'-diphenylsilyleneindenyl) (2,2'-diphenylsilylene-3-trimethylsilylmethylindenyl)zirconium dichloride, (1,1'-diphenylsilyleneindenyl) (2,2'-dimethylsilylene-3-trimethylsilylmethylindenyl)zirconium dichloride, (1,1'-dimethylsilyleneindenyl) (2,2'-diphenylsilylene-3-trimethylsilylmethylindenyl)zirconium dichloride, (1,1'-diisopropylsilyleneindenyl) (2,2'-dimethylsilylene-3-trimethylsilylmethylindenyl)zirconium dichloride, (1,1'-dimethylsilyleneindenyl) (2,2'-diisopropylsilylene-3-trimethylmethylsilylindenyl)zirconium dichloride, and (1,1'-diisopropylsilyleneindenyl) (2,2'-diisopropylsilylene-3-trimethylmethylsilylindenyl)zirconium dichloride; and double-cross-linked metallocene complexes produced by substituting zirconium of these compounds with titanium or hafnium.

Needless to say, the double-cross-linked metallocene complex is not limited to these examples.

The double-cross-linked metallocene complex may be an analog compound containing a metal element belonging to another Group of the periodic table or the lanthanoid series.

In the aforementioned compounds, (1,1'-) (2,2'-) may be replaced with (1,2'-) (2,1'-), or (1,2'-) (2,1'-) may be replaced with (1,1'-) (2,2'-).

Component (B) employed in the present invention; i.e., a solid organoboron compound capable of forming an ion pair with component (A), may be, for example, a coordination complex compound formed of a cation and an anion in which a plurality of groups are bonded to a metal.

Examples of the coordination complex compound formed of a cation and an anion in which a plurality of groups are bonded to a metal include various complex compounds.

Preferably, there is employed, for example, a compound represented by the following formula (III) or (IV):

$$([L^1\text{-}H]^{s+})_t([BZ^1Z^2Z^3Z^4]^-)_l \quad (III)$$

$$([L^2]^{s+})_t([BZ^1Z^2Z^3Z^4]^-)_l \quad (IV)$$

[in formula (III) or (IV), $L^2$ represents $M^1$, $R^{10}R^{11}M^2$, or $R^{12}_3C$ as described below; $L^1$ represents a Lewis base; $M^1$ represents a metal selected from those belonging to Groups 1 and 8 to 12 of the periodic table; $M^2$ represents a metal selected from those belonging to Groups 8 to 10 of the periodic table; and each of $Z^1$ to $Z^4$ represents a hydrogen atom, a dialkylamino group, an alkoxy group, an aryloxy group, a C1 to C20 alkyl group, a C6 to C20 aryl group, an alkylaryl group, an arylalkyl group, a substituted alkyl group, an organometalloid group, or a halogen atom;
each of $R^{10}$ and $R^{11}$ represents a cyclopentadienyl group, a substituted cyclopentadienyl group, an indenyl group, or a fluorenyl group; $R^{12}$ represents an alkyl group;
s represents an ionic valence of $L^1$-H or $L^2$ and is an integer from 1 to 7; t is an integer of 1 or more; and l=t×s].

$M^1$ represents a metal selected from those belonging to Groups 1 and 8 to 12 of the periodic table, and specific examples thereof include atoms such as Ag, Cu, Na, and Li. $M^2$ represents a metal selected from those belonging to Groups 8 to 10 of the periodic table, and specific examples thereof include atoms such as Fe, Co, and Ni.

Specific examples of the group represented by each of $Z^1$ to $Z^4$ include a dialkylamino group such as a dimethylamino group or a diethylamino group; an alkoxy group such as a methoxy group, an ethoxy group, or an n-butoxy group; an aryloxy group such as a phenoxy group, a 2,6-dimethylphenoxy group, or a naphthyloxy group; a C1 to C20 alkyl group such as a methyl group, an ethyl group, an n-propyl group, an isopropyl group, an n-butyl group, an n-octyl group, or a 2-ethylhexyl group; a C6 to 20 aryl, alkylaryl, or arylalkyl group such as a phenyl group, a p-tolyl group, a benzyl group, a pentafluorophenyl group, a 3,5-di(trifluoromethyl)phenyl group, a 4-tert-butylphenyl group, a 2,6-dimethylphenyl group, a 3,5-dimethylphenyl group, a 2,4-dimethylphenyl group, or a 1,2-dimethylphenyl group; a halogen such as F, Cl, Br, or I; and an organometalloid group such as a tetramethylantimony group, a trimethylsilyl group, a trimethylgermyl group, a diphenylarsine group, a dicyclohexylantimony group, or a diphenylboron group.

Specific examples of the substituted cyclopentadienyl group represented by each of $R^{10}$ and $R^{11}$ include a methylcyclopentadienyl group, a butylcyclopentadienyl group, and a pentamethylcyclopentadienyl group.

In the present invention, specific examples of the anion in which a plurality of groups are bonded to a metal include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B(C_6CF_3F_4)_4^-$, $B(C_6H_5)_4^-$, and $BF_4^-$.

Examples of the metallic cation include $Cp_2Fe^+$, $(MeCp)_2Fe^+$, $(tBuCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$, and $Li^+$. Examples of other cations include nitrogen-containing compounds such as pyridinium, 2,4-dinitro-N,N-diethylanilinium, diphenylammonium, p-nitroanilinium, 2,5-dichloroaniline, p-nitro-N,N-dimethylanilinium, quinolinium, N,N-dimethylanilinium, and N,N-diethylanilinium; carbenium compounds such as triphenylcarbenium, tri(4-methylphenyl)carbenium, and tri (4-methoxyphenyl)carbenium; alkylphosphonium ions such as $CH_3PH_3^+$, $C_2H_5PH_3^+$, $C_3H_7PH_3^+$, $(CH_3)_2PH_2^+$, $(C_2H_5)_2PH_2^+$, $(C_3H_7)_2PH_2^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$, and $(C_3H_7)_4P^+$; and arylphosphonium ions such as $C_6H_6PH_3^+$, $(C_6H_5)_2PH_2^+$, $(C_6H_5)_3PH^+$, $(C_6H_5)_4P^+$, $(C_2H_5)_2(C_6H_5)PH^+$, $(CH_3)(C_6H_5)PH_2^+$, $(CH_3)_2(C_6H_5)PH^+$, and $(C_2H_5)_2(C_6H_5)_2P^+$.

In the present invention, there is employed a coordination complex compound formed of any combination of the aforementioned metallic cations and anions.

Among compounds represented by formulas (III) and (IV), specifically, the below-described ones are particularly preferably employed.

Examples of the compound represented by formula (III) include triethylammonium tetraphenylborate, tri(n-butyl) ammonium tetraphenylborate, trimethylammonium tetraphenylborate, triethylammonium tetrakis(pentafluorophenyl)borate, tri(n-butyl)ammonium tetrakis (pentafluorophenyl)borate, triethylammonium hexafluoroarsenate, pyridinium tetrakis(pentafluorophenyl) borate, pyrrolinium tetrakis(pentafluorophenyl)borate, N,N-dimethylanilinium tetrakis(pentafluorophenyl)borate, and methyldiphenylammonium tetrakis(pentafluorophenyl)borate.

Examples of the compound represented by formula (IV) include ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis (pentafluorophenyl)borate, cyanoferrocenium tetrakis (pentafluorophenyl)borate, silver tetraphenylborate, silver tetrakis(pentafluorophenyl)borate, trityl tetraphenylborate, trityl tetrakis(pentafluorophenyl)borate, and silver tetrafluoroborate.

Examples of preferred coordination complex compounds include those formed of a non-coordinating anion and a substituted triarylcarbenium. The non-coordinating anion may be, for example, a compound represented by the following formula (V):

$$(BZ^1Z^2Z^3Z^4)^- \quad (V)$$

[wherein each of $Z^1$ to $Z^4$ represents a hydrogen atom, a dialkylamino group, an alkoxy group, an aryloxy group, a C1 to C20 alkyl group, a C6 to C20 aryl group (including a halogen-substituted aryl group), an alkylaryl group, an arylalkyl group, a substituted alkyl group, an organometalloid group, or a halogen atom].

The substituted triarylcarbenium may be, for example, a compound represented by the following formula (VI):

$$[CR^{13}R^{14}R^{15}]^+ \quad (VI).$$

In formula (VI), each of $R^{13}$, $R^{14}$, and $R^{15}$ represents an aryl group such as a phenyl group, a substituted phenyl group, a naphthyl group, or an anthracenyl group. $R^{13}$, $R^{14}$, and $R^{15}$ may be identical to or different from one another. However, at least one of $R^{13}$, $R^{14}$, and $R^{15}$ is a substituted phenyl group, a naphthyl group, or an anthracenyl group.

The substituted phenyl group is represented by, for example, the following formula (VII):

$$C_6H_{5-k}R^{16}_k \quad (VII)$$

In formula (VII), $R^{16}$ represents a C1 to C10 hydrocarbyl group, an alkoxy group, an aryloxy group, a thioalkoxy group, a thioaryloxy group, an amino group, an amido group, a carboxyl group, or a halogen atom; and k is an integer from 1 to 5.

When k is 2 or more, a plurality of groups $R^{16}$ may be identical to or different from one another.

Specific examples of the non-coordinating anion represented by formula (V) include tetra(fluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(trifluoromethylphenyl)borate, tetra(toluoyl)borate, tetra(xylyl)borate, (triphenyl, pentafluorophenyl)borate, [tris(pentafluorophenyl), phenyl]borate, and tridecahydride-7,8-dicarbaundecaborate.

Specific examples of the substituted triarylcarbenium represented by formula (VI) include tri(toluoyl)carbenium, tri(methoxyphenyl)carbenium, tri(chlorophenyl)carbenium, tri(fluorophenyl)carbenium, tri(xylyl)carbenium, [di(toluoyl), phenyl]carbenium, [di(methoxyphenyl), phenyl]carbenium, [di(chlorophenyl), phenyl]carbenium, [toluoyl, di(phenyl)]carbenium, [methoxyphenyl, di(phenyl)]carbenium, and [chlorophenyl, di(phenyl)]carbenium.

The catalyst of the present invention contains, in addition to the aforementioned components (A) and (B), an organoaluminum compound as component (C).

The organoaluminum compound (component (C)) may be, for example, a compound represented by the following formula (VIII):

$$R^{20}{}_v AlJ_{3-v} \quad (VII)$$

[wherein $R^{20}$ represents a C1 to C10 alkyl group; J represents a hydrogen atom, a C1 to C20 alkoxy group, a C6 to C20 aryl group, or a halogen atom; and v is an integer from 1 to 3].

Specific examples of the compound represented by formula (VIII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride.

These organoaluminum compounds may be employed singly or in combination of two or more species.

The organoaluminum compound (compound (C)) may be, for example, a chain aluminoxane represented by the following formula (IX):

[F4]

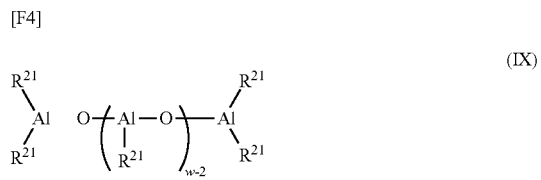

(IX)

(wherein $R^{21}$ represents a C1 to C20 (preferably C1 to C12) hydrocarbon group, such as an alkyl group, an alkenyl group, an aryl group, or an arylalkyl group, or a halogen atom; w represents an average degree of polymerization (which is generally an integer from 2 to 50 (preferably from 2 to 40)); and the groups $R^{21}$ may be identical to or different from one another); or a cyclic aluminoxane represented by the following formula (X):

[F5]

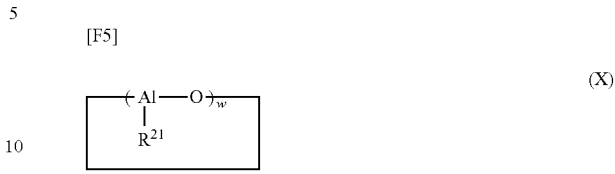

(X)

(wherein $R^{21}$ and w have the same meanings as defined above in formula (IX)).

Examples of the compound represented by formula (IX) or (X) include linear-chain or cyclic alumoxanes, such as tetramethyldialumoxane, tetraisobutyldialumoxane, methylalumoxane, ethylalumoxane, butylalumoxane, and isobutylalumoxane.

Such an aluminoxane may be produced through, for example, a method in which an alkylaluminum is brought into contact with a condensing agent (e.g., water). No particularly limitation is imposed on the means for bringing these materials into contact with each other, and reaction may be carried out through a known method.

These aluminoxanes may be employed singly or in combination of two or more species.

Component (D) employed in the present invention is one or more unsaturated hydrocarbon compounds selected from among an α-olefin, an internal olefin, and a polyene.

Examples of the internal olefin include 2-butene, 2-pentene, 2-hexene, 3-hexene, 2-heptene, 3-heptene, 2-octene, 3-octene, 4-octene, and 5-decene.

Examples of the polyene include diene compounds, such as 1,3-butadiene, 1,5-hexadiene, and 1,7-octadiene.

Examples of the α-olefin include propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene.

One or more of these compounds may be employed.

Component (D) is preferably an α-olefin, particularly preferably a C3 to C30 α-olefin, from the viewpoint of improvement of catalyst activity. More specifically, component (D) is preferably propylene, 1-butene, 1-tetradecene, 1-hexadecene, 1-octadecene, or 1-eicosene, more preferably propylene, 1-tetradecene, or 1-hexadecene.

When an α-olefin having a boiling point of 50° C. or higher at ambient temperature (i.e., an α-olefin having a boiling point equal to or higher than that of 1-pentene) is employed for preparation of a catalyst, a reactor employed for preparation of the catalyst is not required to have pressure resistance, and the corresponding poly-α-olefin (preliminarily polymerized polymer) is less likely to precipitate during storage of the thus-prepared catalyst, whereby problems which would otherwise occur upon transfer of the prepared catalyst (e.g., clogging of a pump) can be prevented.

In the present invention, as described below, bringing components (A) to (D) into contact with one another in the presence of a hydrocarbon solvent facilitates production of a preliminarily polymerized polymer (e.g., control of intrinsic viscosity or preparation of a homogeneous catalyst).

Examples of the hydrocarbon solvent employed in the present invention include aromatic hydrocarbons such as benzene, toluene, xylene, and ethylbenzene; alicyclic hydrocarbons such as cyclopentane, cyclohexane, methylcyclohexane, ethylcyclohexane, decalin, and tetralin; aliphatic hydrocarbons such as pentane, hexane, heptane, and octane;

and halogenated hydrocarbons such as chloroform and dichloromethane. These solvents may be employed singly or in combination of two or more species.

The hydrocarbon solvent employed is preferably an aliphatic hydrocarbon solvent or an alicyclic hydrocarbon solvent, from the viewpoint of safety and health.

Next will be described a method for preparing the polymerization catalyst of the present invention.

For example, the polymerization catalyst of the present invention may be prepared by adding, to a hydrocarbon solvent, component (D); i.e., one or more unsaturated hydrocarbon compounds selected from among an α-olefin, an internal olefin, and a polyene, and component (C); i.e., an organoaluminum compound, and then adding, to the resultant mixture, component (A); i.e., a transition metal compound, and component (B); i.e., a solid organoboron compound capable of forming an ion pair with component (A), followed by contact (or preliminary polymerization) treatment.

No particular limitation is imposed on the order of addition of components (D) and (C), or addition of components (A) and (B).

Preparation of the Polymerization Catalyst May be carried out in the presence of hydrogen (0.005 to 1.0 MPa).

The contact (preliminary polymerization) temperature must be 30 to 60° C., and is preferably 35 to 55° C., more preferably 35 to 45° C. When the contact temperature falls outside the aforementioned range, the polymerization catalyst may fail to exhibit sufficiently improved activity.

The contact (preliminary polymerization) time is generally 10 minutes to 30 days, and is preferably one hour to 15 days. Component (A) and component (B) react with each other while being dissolved in a solvent, to thereby form an active site. Therefore, formation of a homogeneous catalyst system greatly affects improvement of catalyst activity. Thus, when the contact (preliminary polymerization) time is excessively short, sufficient catalyst activity improvement effect may fail to be achieved, whereas when the contact (preliminary polymerization) time is excessively long, catalyst activity may be reduced.

For preparation of the polymerization catalyst of the present invention, the amount of component (B) employed must be 1.2 to 4.0 mol, and is preferably 1.2 to 3.0 mol, more preferably 1.5 to 2.0 mol, on the basis of 1 mol of component (A). When the amount of component (B) is less than 1.2 mol on the basis of 1 mol of component (A), solvent-insoluble matter may be generated, resulting in difficulty in handing of the resultant catalyst solution, whereas when the amount of component (B) exceeds 4.0 mol on the basis of 1 mol of component (A), excess component (B) goes to waste.

The amount of component (C) employed must be 5.0 to 50.0 mol, and is preferably 5.0 to 30.0 mol, more preferably 7.0 to 10.0 mol, on the basis of 1 mol of component (A). When the amount of component (C) is less than 5.0 mol on the basis of 1 mol of component (A), sufficient catalyst activity may fail to be obtained, whereas when the amount of component (C) exceeds 50.0 mol on the basis of 1 mol of component (A), excess component (C) goes to waste.

The amount of component (D) employed is preferably 1.0 to 200 parts by mass, more preferably 5.0 to 100 parts by mass, much more preferably 5.0 to 50 parts by mass, on the basis of 1 part by mass of component (A). When the amount of component (D) is 1 part by mass or more on the basis of 1 part by mass of component (A), the activity of the polymerization catalyst is not reduced over time; i.e., the catalyst exhibits improved storage property, whereas when the amount of component (D) is 200 parts by mass or less on the basis of 1 part by mass of component (A), the resultant catalyst solution does not exhibit excessively high viscosity, and thus the solution is easily supplied to a polymerization system.

When an α-olefin is employed as component (D), the intrinsic viscosity of a poly-α-olefin (preliminarily polymerized polymer) produced through preliminary polymerization is preferably 0.05 dL/g or more and less than 15 dL/g.

The maximum of the intrinsic viscosity is more preferably less than 10 dL/g, much more preferably less than 5 dL/g.

When the intrinsic viscosity exceeds 15 dL/g, the viscosity of the resultant polymerization catalyst solution increases accordingly, which may cause a problem upon supply of the polymerization catalyst solution to a polymerization system.

The intrinsic viscosity [η] is measured in a decalin solvent at 135° C. by means of an automatic viscometer (model: VMR-053, product of Rigo Co., Ltd.)

When an aromatic hydrocarbon is employed as a solvent in the aforementioned catalyst preparation method, a homogeneous polymerization catalyst is generally produced. However, when the ratio by mole of component (B) to component (A) is adjusted to 5 or more, and the concentration of component (A) is adjusted to 10 μmol/mL or higher, a non-homogeneous catalyst is likely to be produced.

Meanwhile, when an alicyclic or aliphatic hydrocarbon is employed as a solvent, since components (A) and (B) exhibit low solubility in such a solvent, a non-homogeneous catalyst is likely to be produced.

In the present invention, the C3 to C30 α-olefin employed for main polymerization may be the same as the aforementioned α-olefin employed as component (D).

Specific examples of the α-olefin include propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. One or more of these olefins may be employed.

Next will be described conditions of main polymerization of an α-olefin by means of the polymerization catalyst of the present invention produced by bringing components (A), (B), (C), and (D) into contact with one another.

The polymerization temperature is generally −100 to 250° C., preferably −50 to 200° C., more preferably 0 to 130° C.

The polymerization pressure is preferably ambient pressure to 20 MPa (gauge), more preferably ambient pressure to 10 MPa (gauge).

The polymerization time is generally five minutes to 15 hours.

The ratio by mole of the C1 to C30 α-olefin to component (A) in the polymerization catalyst is preferably 1 to $10^8$, more preferably 100 to $10^5$.

In this main polymerization process, component (C) may be further added to the polymerization catalyst of the present invention produced by bringing components (A), (B), (C), and (D) into contact with one another.

Examples of preferred organoaluminum compounds (component (C)) include trialkylaluminums such as trimethylaluminum, triethylaluminum, triisobutylaluminum, and trioctylaluminum; and alumoxanes such as tetraisobutylalumoxane, methylalumoxane, and isobutylalumoxane.

The molecular weight of the poly-α-olefin may be regulated through, for example, selection of the type of each catalyst component, the amount of use thereof, or the polymerization temperature, or polymerization in the presence of hydrogen.

The main polymerization process is carried out through bulk polymerization, solution polymerization, or suspension polymerization.

The solvent employed for main polymerization may optionally be the same as the hydrocarbon solvent employed for preparation of the catalyst.

Examples of the hydrocarbon solvent include aromatic hydrocarbons such as benzene, toluene, xylene, and ethylbenzene; alicyclic hydrocarbons such as cyclopentane, cyclohexane, methylcyclohexane, decalin, and tetralin; aliphatic hydrocarbons such as pentane, hexane, heptane, and octane; and halogenated hydrocarbons such as chloroform and dichloromethane. Toluene, xylene, or decalin is preferably employed.

These solvents may be employed singly or in combination of two or more species.

A monomer such as an α-olefin may be employed as a solvent.

The main polymerization process may optionally be carried out in the absence of a solvent.

The present invention also provides a method of storing the polymerization catalyst of the present invention prepared as described above, wherein the polymerization catalyst is stored at 0 to 35° C., preferably at 3 to 30° C., more preferably at 5 to 20° C. When the storage temperature falls outside the above range, the activity of the polymerization catalyst is reduced over time; i.e., the catalyst exhibits impaired storage property.

Preferably, the polymerization catalyst of the present invention is stored in an inert gas atmosphere, and furthermore, under light shielding conditions.

According to the polymerization catalyst storing method of the present invention, the polymerization catalyst can be stored over a long period of time. The storage period is preferably about one month to about six years, more preferably one month to one year.

EXAMPLES

The present invention will next be described in more detail by way of examples, which should not be construed as limiting the invention thereto.

Production Example 1

Synthesis of (1,2'-dimethylsilylene) (2,1'-dimethylsilylene)-bis(3-trimethylsilylmethylindenyl)zirconium dichloride (1,2'-Dimethylsilylene) (2,1'-dimethylsilylene)-bis(indene) lithium salt (3.0 g, 6.97 mmol) was added to a Schlenk bottle and dissolved in tetrahydrofuran (THF) (50 mL), and the resultant solution was cooled to −78° C. Iodomethyltrimethylsilane (2.1 mL, 14.2 mmol) was slowly added dropwise to the bottle, and the resultant mixture was stirred at room temperature for 12 hours.

The solvent was removed through evaporation, and ether (50 mL) was added to the bottle, followed by washing with a saturated ammonium chloride solution. After phase separation, the organic phase was dried, and the solvent was removed, to thereby produce (1,2'-dimethylsilylene) (2,1'-dimethylsilylene)-bis(3-trimethylsilylmethylindene) (3.04 g, 5.88 mmol) (yield: 84%).

Subsequently, the above-produced (1,2'-dimethylsilylene) (2,1'-dimethylsilylene)-bis(3-trimethylsilylmethylindene) (3.04 g, 5.88 mmol) and ether (50 mL) were added to a Schlenk bottle under a stream of nitrogen. The resultant mixture was cooled to −78° C., and a hexane solution of n-butyllithium (n-BuLi) (1.54 mol/L, 7.6 mL (11.7 mmol)) was added dropwise thereto. The resultant mixture was heated to room temperature and stirred for 12 hours, and then ether was removed through evaporation. The resultant solid matter was washed with hexane (40 mL), to thereby produce a lithium salt as an ether adduct (3.06 g, 5.07 mmol) (yield: 73%).

The measurement results of $^1$H-NNR (90 MHz, THF-$d_8$) are as follows.

δ: 0.04 (s, 18H, trimethylsilyl), 0.48 (s, 12H, dimethylsilylene), 1.10 (t, 6H, methyl), 2.59 (s, 4H, methylene), 3.38 (q, 4H, methylene), 6.2-7.7 (m, 8H, Ar—H).

The above-produced lithium salt was dissolved in toluene (50 mL) under a stream of nitrogen. The resultant solution was cooled to −78° C., and a suspension of zirconium tetrachloride (1.2 g, 5.1 mmol) in toluene (20 mL) which had been cooled to −78° C. in advance was added dropwise to the solution. After completion of dropwise addition, the resultant mixture was stirred at room temperature for six hours. The solvent was removed from the reaction mixture through evaporation. The resultant residue was recrystallized from dichloromethane, to thereby produce (1,2'-dimethylsilylene) (2,1'-dimethylsilylene)-bis(3-trimethylsilylmethylindenyl) zirconium dichloride (0.9 g, 1.33 mmol) (yield: 26%).

The measurement results of $^1$H-NNR (90 MHz, CDCl$_3$) are as follows.

δ: 0.0 (s, 18H, trimethylsilyl), 1.02, 1.12 (s, 12H, dimethylsilylene), 2.51 (dd, 4H, methylene), 7.1-7.6 (m, 8H, Ar—H).

Example 1

Preparation of Catalyst 1

Toluene (treated with sufficient nitrogen bubbling) (196 mL) was added to a 1-L autoclave equipped with a stirrer at room temperature under a stream of nitrogen. Subsequently, triisobutylaluminum (4.5 mL, 9 mmol, 2M), (1,2'-dimethylsilylene) (2,1'-dimethylsilylene)bis(3-trimethylsilylmethylindenyl)zirconium dichloride (40 mL, 1,200 μmol, 30 μmol/mL), and a heptane slurry of dimethylanilinium tetrakis (pentafluorophenyl)borate (60 mL, 1,800 μmol, 30 μmol/mL) were sequentially added to the autoclave with stirring. Thereafter, propylene was supplied to the autoclave while the pressure was adjusted to 0.05 MPa, and the autoclave was heated to 30° C., to thereby initiate preliminary polymerization. Fifteen minutes later, supply of propylene was stopped, and the resultant mixture was further stirred for 30 minutes, to thereby produce catalyst 1 in solution form (catalyst concentration: 4 mmol/L). The amount of the thus-polymerized propylene was estimated to be 16.3 g on the basis of the amount of consumed propylene (8.7 L).

(Polymerization)

Heptane (400 mL) was added to a 1-L autoclave at 25° C. under a stream of nitrogen, and a heptane solution of triisobutylaluminum (2 M, 0.4 mmol, 0.2 mL) was added thereto. After one-minute stirring, catalyst 1 (0.05 mL, 0.2 μmol) was added to the autoclave. Subsequently, while hydrogen (0.04 MPa) and propylene (total pressure: 0.74 MPa) were added, the resultant mixture was heated to 70° C. over about three minutes with stirring. After addition of propylene, polymerization was carried out for 15 minutes. Thereafter, ethanol (5 mL) was added, and polymerization was stopped. After release of pressure, the resultant polymerization mixture was dried at 80° C. under reduced pressure, to thereby produce a propylene polymer.

Regarding the thus-produced propylene polymer, the polymerization activity and viscosity-based handleability of the catalyst were evaluated through the below-described methods. Table 1 shows catalyst preparation conditions and evaluation results (based on the polymer).
(Evaluation of Polymerization Activity)

Generally, in the case where different types of monomers are employed, or polymerization is carried out under different conditions, even the same catalyst exhibits considerably different activities. Therefore, for comparison of the polymerization activities of catalysts (the polymerization activity of each catalyst was evaluated on the basis of the amount of a polymer produced), the catalysts were employed in the same amount, polymerization was carried out under the same conditions, and the same monomer was employed.
(Viscosity-Based Handleability)

Since the catalyst is uniformly dissolved in a solvent, the catalyst components added to an autoclave upon initiation of polymerization are collected by means of a syringe. Upon collection of the catalyst solution by means of the syringe, when the catalyst solution exhibits high viscosity, the syringe piston is difficult to draw out of the syringe. Handleability of the catalyst solution was evaluated on the basis of the following criteria (ease of drawing out of the syringe piston):
AA: the syringe piston is very easy to draw out;
BB: the syringe piston is easy to draw out; and
CC: the syringe piston is difficult to draw out.

Example 2

The procedure of Example 1 (preparation of catalyst 1) was repeated, except that the amount of toluene employed was changed from 196 mL to 176 mL; the amount of a heptane slurry of dimethylanilinium tetrakis(pentafluorophenyl)borate employed was changed from (60 mL, 1,800 µmol, 30 µmol/mL) to (80 mL, 2,400 µmol, 30 µmol/mL); and the temperature of preliminary polymerization was changed from 30° C. to 40° C., to thereby produce a propylene polymer. Table 1 shows catalyst preparation conditions and evaluation results (based on the polymer).

Example 3

The procedure of Example 1 (preparation of catalyst 1) was repeated, except that the temperature of preliminary polymerization was changed from 30° C. to 60° C., to thereby produce a propylene polymer. Table 1 shows catalyst preparation conditions and evaluation results (based on the polymer).

Example 4

The procedure of Example 1 (preparation of catalyst 1) was repeated, except that the amount of propylene consumed was changed from 8.7 L to 4.4 L, to thereby produce a propylene polymer. Table 1 shows catalyst preparation conditions and evaluation results (based on the polymer).

Comparative Example 1

The procedure of Example 1 (preparation of catalyst 1) was repeated, except that the temperature of preliminary polymerization was changed from 30° C. to 20° C., to thereby produce a propylene polymer. Table 2 shows catalyst preparation conditions and evaluation results (based on the polymer).

Comparative Example 2

The procedure of Example 1 (preparation of catalyst 1) was repeated, except that the temperature of preliminary polymerization was changed from 30° C. to 80° C., to thereby produce a propylene polymer. Table 2 shows catalyst preparation conditions and evaluation results (based on the polymer).

Comparative Example 3

The procedure of Example 1 (preparation of catalyst 1) was repeated, except that the amount of toluene employed was changed from 196 mL to 212 mL, and the amount of a heptane slurry of dimethylanilinium tetrakis(pentafluorophenyl)borate employed was changed from (60 mL, 1,800 µmol, 30 mmol/mL) to (44 mL, 1,320 µmol, 30 µmol/mL), to thereby produce a propylene polymer. Table 2 shows catalyst preparation conditions and evaluation results (based on the polymer).

Comparative Example 4

The procedure of Example 1 (preparation of catalyst 1) was repeated, except that the amount of toluene employed was changed from 196 mL to 200 mL, and the amount of triisobutylaluminum employed was changed from (4.5 mL, 9 mmol, 2 M) to (1.2 mL, 2.4 mmol, 2 M), to thereby produce a propylene polymer. Table 2 shows catalyst preparation conditions and evaluation results (based on the polymer).

Example 5

Preparation of Catalyst 2

Toluene (treated with sufficient nitrogen bubbling) (13 mL) and Linealene 18 (1-octadecene, product of Idemitsu Kosan Co., Ltd.) (2 mL, 1.5 g) were added to a 50-mL Schlenk bottle equipped with a stirrer at 60° C. under a stream of nitrogen. Subsequently, triisobutylaluminum (0.2 mL, 0.4 mmol, 2 M), ethylenebisindenylzirconium dichloride (product of Strem) (2 mL, 40 µmol, 20 µmol/mL), and a heptane slurry of dimethylanilinium tetrakis(pentafluorophenyl)borate (3 mL, 60 µmol, 20 µmol/mL) were sequentially added to the Schlenk bottle with stirring. The resultant mixture was stirred for six hours, to thereby produce catalyst 2 in solution form (catalyst concentration: 2 mmol/L).
(Polymerization)

Linealene 18 (1-octadecene, product of Idemitsu Kosan Co., Ltd.) (400 mL) was added to a 1-L autoclave at 85° C. under a stream of nitrogen, and a heptane solution of triisobutylaluminum (2 M, 1 mmol, 0.5 mL) was added thereto. After one-minute stirring, catalyst 2 (1 mL, 2 µmol) was added to the autoclave. Subsequently, hydrogen (0.15 MPa) was added, and then the resultant mixture was heated to 90° C. over about one minute with stirring. Sixty minutes later, ethanol (5 mL) was added to the mixture. The resultant polymerization mixture was cooled to 50° C. and then added to acetone (400 mL). Thereafter, the supernatant was discarded, and acetone (400 mL) was added to the residue. The resultant mixture was stirred and allowed to stand still, and then the supernatant was discarded. The thus-polymerized product was dried at 140° C. under reduced pressure, to thereby produce a polymer of interest.

Regarding the thus-produced polymer, the polymerization activity and viscosity-based handleability of the catalyst were evaluated in a manner similar to that described in Example 1. Table 1 shows catalyst preparation conditions and evaluation results (based on the polymer).

Example 6

The procedure of Example 5 (preparation of catalyst 2) was repeated, except that the amount of toluene employed was changed from 13 mL to 11 mL, and the amount of Linealene 18 (1-octadecene, product of Idemitsu Kosan Co., Ltd.) employed was changed from (2 mL, 1.5 g) to (4 mL, 3.0 g), to thereby produce a polymer. Table 1 shows catalyst preparation conditions and evaluation results (based on the polymer).

Comparative Example 5

The procedure of Example 5 (preparation of catalyst 2) was repeated, except that the temperature of preliminary polymerization was changed from 60° C. to 20° C., to thereby produce a polymer. Table 2 shows catalyst preparation conditions and evaluation results (based on the polymer).

Comparative Example 6

The procedure of Example 5 (preparation of catalyst 2) was repeated, except that the amount of toluene employed was changed from 13 mL to 9 mL, and the amount of Linealene 18 (1-octadecene, product of Idemitsu Kosan Co., Ltd.) employed was changed from (2 mL, 1.5 g) to (6 mL, 4.5 g), to thereby produce a polymer. Table 2 shows catalyst preparation conditions and evaluation results (based on the polymer).

Example 7

Preparation of Catalyst 3

Toluene (treated with sufficient nitrogen bubbling) (13 mL) and Linealene 18 (1-octadecene, product of Idemitsu Kosan Co., Ltd.) (2 mL, 1.5 g) were added to a 50-mL Schlenk bottle equipped with a stirrer at 30° C. under a stream of nitrogen. Subsequently, triisobutylaluminum (0.2 mL, 0.4 mmol, 2M), bis(tetramethylcyclopentadienyl)zirconium dichloride (product of Strem) (2 mL, 40 µmol, 20 µmol/mL), and a heptane slurry of dimethylanilinium tetrakis(pentafluorophenyl)borate (3 mL, 60 µmol, 20 µmol/mL) were sequentially added to the Schlenk bottle with stirring. The resultant mixture was stirred for six hours, to thereby produce catalyst 3 in solution form (catalyst concentration: 2 mmol/L).

(Polymerization)

Linealene 18 (1-octadecene, product of Idemitsu Kosan Co., Ltd.) (400 mL) was added to a 1-L autoclave at 85° C. under a stream of nitrogen, and a heptane solution of triisobutylaluminum (2 M, 1 mmol, 0.5 mL) was added thereto. After one-minute stirring, catalyst 3 (0.5 mL, 1 µmol) was added to the autoclave. Subsequently, hydrogen (0.15 MPa) was added, and then the resultant mixture was heated to 90° C. over about one minute with stirring. Sixty minutes later, ethanol (5 mL) was added to the mixture. The resultant polymerization mixture was cooled to 50° C. and then added to acetone (400 mL). Thereafter, the supernatant was discarded, and acetone (400 mL) was added to the residue. The resultant mixture was stirred and allowed to stand still, and then the supernatant was discarded. The thus-polymerized product was dried at 140° C. under reduced pressure, to thereby produce a polymer of interest.

Regarding the thus-produced polymer, the polymerization activity and viscosity-based handleability of the catalyst were evaluated in a manner similar to that described in Example 1. Table 1 shows catalyst preparation conditions and evaluation results (based on the polymer).

Comparative Example 7

The procedure of Example 7 (preparation of catalyst 3) was repeated, except that the temperature of preliminary polymerization was changed from 30° C. to 0° C., to thereby produce a polymer. Table 2 shows catalyst preparation conditions and evaluation results (based on the polymer).

TABLE 1

| | | | Examples | | | | | | |
| --- | --- | --- | --- | --- | --- | --- | --- | --- | --- |
| | | | 1 | 2 | 3 | 4 | 5 | 6 | 7 |
| Catalyst preparation conditions | (A) Transition metal compound | (µmol) | 1200 | 1200 | 1200 | 1200 | 40 | 40 | 40 |
| | (B) Boron compound | (µmol) | 1800 | 2400 | 1800 | 1800 | 60 | 60 | 60 |
| | (B) Boron compound/ (A) Transition metal compound | (mol/mol) | 1.5 | 2 | 1.5 | 1.5 | 1.5 | 1.5 | 1.5 |
| | (C) Organoaluminum | (mmol) | 9 | 9 | 9 | 9 | 0.4 | 0.4 | 0.4 |
| | (C) Organoaluminum/ (A) Transition metal compound | (mol/mol) | 7.5 | 7.5 | 7.5 | 7.5 | 10 | 10 | 10 |
| | (D) Unsaturated hydrocarbon compound employed for catalyst preparation | (g) | 16.3 | 16.3 | 16.3 | 8.2 | 1.5 | 3.0 | 1.5 |
| | (D) Unsaturated hydrocarbon compound/ (A) Transition metal compound | (mass/mass) | 20 | 20 | 20 | 10 | 90 | 179 | 93 |
| | Preliminary polymerization temperature | (° C.) | 30 | 40 | 60 | 30 | 60 | 60 | 30 |
| Evaluation | Polymerization activity | (g) | 105 | 110 | 98 | 105 | 150 | 156 | 148 |
| | Viscosity-based handleability | | AA | AA | AA | AA | BB | BB | BB |

TABLE 2

| | | | Comparative Examples | | | | | | |
| --- | --- | --- | --- | --- | --- | --- | --- | --- | --- |
| | | | 1 | 2 | 3 | 4 | 5 | 6 | 7 |
| Catalyst preparation conditions | (A) Transition metal compound | (µmol) | 1200 | 1200 | 1200 | 1200 | 40 | 40 | 40 |
| | (B) Boron compound | (µmol) | 1800 | 1800 | 1320 | 1800 | 60 | 60 | 60 |
| | (B) Boron compound/ (A) Transition metal compound | (mol/mol) | 1.5 | 1.5 | 1.1 | 1.5 | 1.5 | 1.5 | 1.5 |
| | (C) Organoaluminum | (mmol) | 9 | 9 | 9 | 2.4 | 0.4 | 0.4 | 0.4 |
| | (C) Organoaluminum/ (A) Transition metal compound | (mol/mol) | 7.5 | 7.5 | 7.5 | 2 | 10 | 10 | 10 |

TABLE 2-continued

|  |  |  | Comparative Examples | | | | | | |
|---|---|---|---|---|---|---|---|---|---|
|  |  |  | 1 | 2 | 3 | 4 | 5 | 6 | 7 |
|  | (D) Unsaturated hydrocarbon compound employed for catalyst preparation | (g) | 16.3 | 16.3 | 16.3 | 16.3 | 1.5 | 4.5 | 1.5 |
|  | (D) Unsaturated hydrocarbon compound/ (A) Transition metal compound | (mass/mass) | 20 | 20 | 20 | 20 | 90 | 269 | 93 |
|  | Preliminary polymerization temperature | (° C.) | 20 | 80 | 40 | 40 | 20 | 30 | 0 |
| Evaluation | Polymerization activity | (g) | 67 | 73 | 68 | 80 | 90 | 150 | 90 |
|  | Viscosity-based handleability |  | AA | AA | AA | AA | BB | CC | BB |

As is clear from the aforementioned comparison of catalysts (employment of the same monomer, and polymerization under the same conditions), when a preactivated catalyst is prepared under conditions specified in the present invention, the resultant solution-form catalyst exhibits high activity.

Example 8

Solution-form catalyst 1 prepared in Example 1 was stored at 5° C. for one month, and then the polymerization activity of the catalyst was evaluated in a manner similar to that described in Example 1. For evaluation of polymerization activity, the percent activity maintenance of the catalyst; i.e., (the amount of a polymer produced in Example 8)/(the amount of a polymer produced in Example 1), was determined. The results are shown in Table 3.

Examples 9 to 13 and Comparative Examples 8 to 11

The procedure of Example 8 was repeated, except that the respective solution-form catalysts were stored at the temperatures shown in Table 3, to thereby evaluate the percent activity maintenance of the catalysts. The results are shown in Table 3.

TABLE 3

|  | Storage temperature | Catalyst employed | Percent activity maintenance (%) |
|---|---|---|---|
| Example 8 | 5° C. | Catalyst 1 | 98 |
| Example 9 | 5° C. | Catalyst 2 | 99 |
| Example 10 | 25° C. | Catalyst 1 | 97 |
| Example 11 | 25° C. | Catalyst 2 | 98 |
| Example 12 | 30° C. | Catalyst 1 | 83 |
| Example 13 | 30° C. | Catalyst 2 | 89 |
| Comparative Example 8 | −5° C. | Catalyst 1 | 63 |
| Comparative Example 9 | −5° C. | Catalyst 2 | 59 |
| Comparative Example 10 | 40° C. | Catalyst 1 | 45 |
| Comparative Example 11 | 40° C. | Catalyst 2 | 42 |

These data indicate that the storing method of the present invention can suppress reduction in the activity of the polymerization catalyst of the present invention.

INDUSTRIAL APPLICABILITY

As described above in detail, the polymerization catalyst of the present invention exhibits excellent polymerization activity, and thus realizes easy production of poly-α-olefin at high yield and low cost.

The invention claimed is:

1. A homogenous polymerization catalyst, obtained by a process comprising:
contacting a component (A), a component (B), a component (C), and a component (D) with one another in at least one hydrocarbon solvent at a temperature in a range of 30 to 60° C.,
wherein the component (A) is a transition metal compound, the component (B) is a solid boron compound capable of forming an ion pair with the component (A), the component (C) comprises an organoaluminum compound, and the component (D) comprises at least one unsaturated hydrocarbon compound selected from the group consisting of an α-olefin, an internal olefin, and a polyene,
an amount of the component (B) and the component (C) is 1.2 to 4.0 mol and 5.0 to 50.0 mol, respectively, based on 1 mol of the component (A), and
an amount of the component (D) is 1.0 to 200 parts by mass, based on 1 part by mass of the component (A).

2. The homogenous polymerization catalyst of claim 1, wherein the component (D) is a C3 to C30 α-olefin.

3. A method of storing a polymerization catalyst, the method comprising:
storing the homogenous polymerization catalyst of claim 1 at a temperature in a range of 0 to 35° C.

4. The homogenous polymerization catalyst of claim 1, wherein the component (A) is a chelate complex, a metallocene complex comprising a non-cross-linked ligand, or a metallocene complex comprising cross-linked ligand.

5. The homogenous polymerization catalyst of claim 4, wherein the component (A) is a chelate complex selected from the group consisting of N,N'-bis(2,6-diisopropylphenyl)-1,2-dimethylethylenediiminonickel dibromide and N,N'-bis(2,6-diisopropylphenyl)-1,2-dimethylethylenediiminopalladium dibromide.

6. The homogenous polymerization catalyst of claim 4, wherein the component (A) is a metallocene complex comprising a non-cross-linked ligand selected from the group consisting of biscyclopentadienylzirconium dichloride, bis(n-butylcyclopentadienyl)zirconium dichloride, bis(pentamethylcyclopentadienyl)zirconium dichloride, bisindenylzirconium dichloride, and bis(tetramethylcyclopentadienyl)zirconium dichloride.

7. The homogenous polymerization catalyst of claim 4, wherein the component (A) is a metallocene complex comprising a cross-linked ligand selected from the group consisting of dimethylsilylene(tetramethylcyclopentadienyl)(3-tert-butyl-5-methyl-2-phenoxy)zirconium dichloride, dimethylsilylene(tetramethylcyclopentadienyl)(tert-butylamido)zirconium dichloride, dimethylsilylenebis(2-methyl-4,5-benzoindenyl)zirconium dichloride, dimethylsilylenebis(2-methyl-4-phenylindenyl)zirconium dichloride, dimethylsilylenebis(2-methyl-4-naphthylindenyl)zirconium dichloride, dimethylsilylenebis(2-methylindenyl)zirconium dichloride, ethylenebis(2-methylindenyl)zirconium dichloride, and ethylenebisindenylzirconium dichloride.

8. The homogenous polymerization catalyst of claim 1, wherein the component (B) is a coordination complex compound selected from the group consisting of triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl)borate, pyrrolinium tetrakis(pentafluorophenyl)borate, N,N-dimethylanilinium tetrakis(pentafluorophenyl)borate, and methyldiphenylammonium tetrakis(pentafluorophenyl)borate.

9. The homogenous polymerization catalyst of claim 1, wherein the component (B) is a coordination complex compound comprising selected from the group consisting of ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, and silver tetrafluoroborate.

10. The homogenous polymerization catalyst of claim 1, wherein the component (C) comprises at least one selected from the group consisting of trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride.

11. The homogenous polymerization catalyst of claim 1, wherein the component (C) comprises at least one selected from the group consisting of tetramethyldialumoxane, tetraisobutyldialumoxane, methylalumoxane, ethylalumoxane, butylalumoxane, and isobutylalumoxane.

12. The homogenous polymerization catalyst of claim 1, wherein the component (D) comprises an α-olefin.

13. The homogenous polymerization catalyst of claim 12, wherein the component (D) comprises at least one α-olefin selected from the group consisting of propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene.

14. The homogenous polymerization catalyst of claim 13, wherein the α-olefin is propylene.

15. The homogenous polymerization catalyst of claim 13, wherein the α-olefin is 1-tetradecene.

16. The homogenous polymerization catalyst of claim 13, wherein the α-olefin is 1-hexadecene.

17. The homogenous polymerization catalyst of claim 1, wherein the component (D) comprises at least one internal olefin selected from the group consisting of 2-butene, 2-pentene, 2-hexene, 3-hexene, 2-heptene, 3-heptene, 2-octene, 3-octene, 4-octene, and 5-decene.

18. The homogenous polymerization catalyst of claim 1, wherein the component (D) comprises at least one polyene selected from the group consisting of 1,3-butadiene, 1,5-hexadiene, and 1,7-octadiene.

19. The homogenous polymerization catalyst of claim 1, wherein the temperature is in a range from 35-45° C.

20. The homogenous polymerization catalyst of claim 1, wherein the hydrocarbon solvent is selected from the group consisting of toluene, xylene, and decalin.

21. The homogenous polymerization catalyst of claim 1, wherein the component (B) is a coordination complex compound comprising an anion represented by the following formula:

$$(BZ^1Z^2Z^3Z^4)^-$$

wherein each of $Z^1$ to $Z^4$ represents a hydrogen atom, a dialkylamino group, an alkoxy group, an aryloxy group, a C1 to C20 alkyl group, a C6 to C20 aryl group, a halogen-substituted C6 to C20 aryl group, an alkylaryl group, an arylalkyl group, a substituted alkyl group, an organometalloid group, or a halogen atom.

22. The homogenous polymerization catalyst of claim 1, wherein the component (A) is a metallocene complex comprising a cross-linked ligand.

23. The homogenous polymerization catalyst of claim 22, wherein the metallocene complex comprising a cross-linked ligand is a double cross-linked metallocene complex and comprises the complex of formula (I)

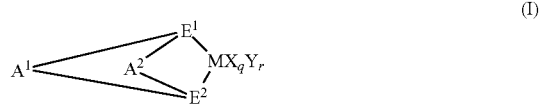

wherein
M represents titanium, zirconium, or hafnium;
$E^1$ and $E^2$ independently represent a ligand selected from the group consisting of a substituted cyclopentadienyl group, an indenyl group, a substituted indenyl group, a heterocyclopentadienyl group, a substituted heterocyclopentadienyl group, an amido group, a phosphido group, a hydrocarbon group, and a silicon-containing group,
$E^1$ and $E^2$ form a cross-linked structure via $A^1$ and $A^2$;
X represents a σ-bonding ligand, and, when a plurality of ligands X are present, the ligands X may be identical to or different from one another, and one ligand X may be cross-linked with another ligand X, $E^1$, $E^2$, or Y;
Y represents a Lewis base, and, when a plurality of Lewis bases Y are present, the bases Y may be identical to or different from one another, and one base Y may be cross-linked with another base Y, $E^1$, $E^2$, or X;
$A^1$ and $A^2$ independently represent a divalent cross-linking group for bonding two ligands and represents a C1 to C20 hydrocarbon group, a C1 to C20 halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$—, wherein $R^1$ represents a hydrogen atom, a halogen atom, a C1 to C20 hydrocarbon group, or a C1 to C20 halogen-containing hydrocarbon group, and
$A^1$ and $A^2$ may be identical to or different from each other; q is an integer from 1 to 5 [(valence of M)−2]; and r is an integer from 0 to 3.

24. The homogenous polymerization catalyst of claim 1, wherein the component (D) comprises a C3 to C30 α-olefin.

25. The homogenous polymerization catalyst of claim 1, wherein the hydrocarbon solvent is an aromatic hydrocarbon solvent.

26. The homogenous polymerization catalyst of claim 1, which is obtained by contacting components (A), (B), (C) and (D) with one another in at least one hydrocarbon solvent for 10 minutes to 30 days.

* * * * *